(12) United States Patent
Fountain

(10) Patent No.: US 9,911,251 B2
(45) Date of Patent: Mar. 6, 2018

(54) VEHICLE DIAGNOSTIC SYSTEM AND METHOD

(71) Applicants: Bosch Automotive Service Solutions Inc., Warren, MI (US); Robert Bosch GmbH, Stuttgart (DE)

(72) Inventor: Gregory J. Fountain, Kalamazoo, MI (US)

(73) Assignees: Bosch Automotive Service Solutions Inc., Warren, MI (US); Robert Bosch GmbH, Stuttgart (DE)

( * ) Notice: Subject to any disclaimer, the term of this patent is extended or adjusted under 35 U.S.C. 154(b) by 68 days.

(21) Appl. No.: 14/970,348

(22) Filed: Dec. 15, 2015

(65) Prior Publication Data

US 2016/0171802 A1    Jun. 16, 2016

Related U.S. Application Data

(60) Provisional application No. 62/091,659, filed on Dec. 15, 2014.

(51) Int. Cl.
*G07C 5/08* (2006.01)
*G07C 5/00* (2006.01)
*H04W 4/00* (2009.01)
*G01M 17/00* (2006.01)

(52) U.S. Cl.
CPC ........... *G07C 5/0808* (2013.01); *G01M 17/00* (2013.01); *G07C 5/08* (2013.01); *G07C 5/0816* (2013.01); *G07C 5/0841* (2013.01); *G07C 5/0866* (2013.01); *H04W 4/008* (2013.01); *G07C 5/008* (2013.01); *G07C 2205/02* (2013.01)

(58) Field of Classification Search
CPC ...... G07C 5/0808; G07C 5/08; G07C 5/0816; G07C 5/0841; G07C 2205/02; G07C 5/0866; G07C 5/008; H04W 4/008; G01M 17/00
See application file for complete search history.

(56) References Cited

U.S. PATENT DOCUMENTS 6,529,620 B2 * 3/2003 Thompson ............. G07C 5/008
                                                        701/29.4
8,195,231 B2 * 6/2012 Ring ...................... G07C 5/008
                                                        455/557
9,149,929 B2 * 10/2015 Motzer ................... B25J 9/162
(Continued)

*Primary Examiner* — Dale W Hilgendorf
(74) *Attorney, Agent, or Firm* — Maginot Moore & Beck LLP

(57) ABSTRACT

A vehicle diagnostic system for a vehicle including an electronic control unit (ECU) and an associated diagnostic port includes a dongle, an imaging device, and a single wireless device. The dongle is configured to mate with the diagnostic port to enable the dongle to establish a wired communication link with the ECU. The imaging device is configured to generate imaging data. The single wireless device includes a display unit, an input unit, a memory storing program instructions, and a processor. The processor is configured to execute the program instructions to establish a wireless communication link with the ECU via the dongle, to receive diagnostic data from the ECU, to render the received diagnostic data on the display unit, to receive user input data from the input unit based on the rendered diagnostic data, and to transmit the user input data to the ECU.

14 Claims, 2 Drawing Sheets

(56) References Cited

U.S. PATENT DOCUMENTS

| | | | |
|---|---|---|---|
| 2008/0015748 A1* | 1/2008 | Nagy | G07C 5/008 701/31.4 |
| 2008/0045989 A1* | 2/2008 | Welborn | A61B 17/32003 606/170 |
| 2009/0276115 A1* | 11/2009 | Chen | G07C 5/008 701/29.6 |
| 2010/0210254 A1* | 8/2010 | Kelly et al. | G07C 5/008 455/418 |
| 2012/0053781 A1* | 3/2012 | Namaky | G07C 5/008 701/31.5 |
| 2012/0209470 A1* | 8/2012 | Gilbert | G07C 5/008 701/31.4 |
| 2015/0105967 A1* | 4/2015 | Skipp et al. | G07C 5/008 701/31.4 |

* cited by examiner

VEHICLE DIAGNOSTIC SYSTEM AND METHOD

This application claims the benefit of priority of U.S. provisional application Ser. No. 62/091,659, filed on Dec. 15, 2014 the disclosure of which is herein incorporated by reference in its entirety.

This disclosure relates generally to automotive diagnostic systems and particularly to a system and a method for diagnosing vehicle issues.

BACKGROUND

In recent years, vehicles and the field of automotive maintenance have experienced rapid growth in computerized systems both within automotive vehicles and in computerized diagnostic tools that identify maintenance issues with the vehicles. For example, most modern vehicles include one or more computer systems that are often referred to as an electronic control unit (ECU). In some vehicles, the ECU controls and monitors the operations of numerous systems including, but not limited to, the engine, steering, tires, transmission, brakes, fuel delivery, battery level monitoring, and climate control systems. Some vehicles also include numerous sensors that monitor various aspects of the vehicle systems. The ECU receives the sensor data and is configured to generate diagnostic trouble codes (DTCs) if the sensors indicate that one or more vehicle systems may be failing or operating outside of predetermined parameters.

Many vehicles use a controller area network (CAN) vehicle bus to transmit data between the ECU and the onboard sensors, components, and systems in the vehicle. The CAN bus, or other equivalent data networks in a vehicle, provides a common communication framework between the ECU and the various sensors and systems in the vehicle. Additionally, the CAN bus or equivalent network enables communication between the ECU and external diagnostic tools through a port that is typically accessible from within a cabin of the vehicle near the driver's seat. The ECU and the diagnostic tools interfaced therewith often use an industry standard protocol, such as a version of the on-board diagnostics (OBD) protocol, including the OBD-II protocol.

Diagnostic tools are typically digital computers having communication ports and input/output devices configured to interface with the ECU via the CAN bus. Some diagnostic tools include display screens, which visually relay information to a mechanic and enable the mechanic to perform tests and send commands to the ECU. The ECU and the diagnostic tools interfaced therewith often use an industry standard protocol, such as a version of the on-board diagnostics (OBD) protocol, including the OBD-II protocol.

One type of diagnostic tool is an inspection camera having a sensor portion connected to a display with a hardwired connection. The sensor portion is configured for placement in area of the vehicle that is difficult to access, and is configured to generate image data that is transmitted to the display. These types of inspection cameras, while useful for some diagnostic tasks, require large and bulky specialty equipment. Therefore, further developments in the area of inspection camera diagnostic tools are desirable.

SUMMARY

According to an exemplary embodiment of the disclosure, a vehicle diagnostic system for a vehicle including an electronic control unit (ECU) and an associated diagnostic port includes a dongle, an imaging device, and a single wireless device. The dongle is configured to mate with the diagnostic port to enable the dongle to establish a wired communication link with the ECU. The imaging device is configured to generate imaging data. The single wireless device includes a display unit, an input unit, a memory storing program instructions, and a processor. The processor is configured to execute the program instructions to establish a wireless communication link with the ECU via the dongle, to receive diagnostic data from the ECU, to render the received diagnostic data on the display unit, to receive user input data from the input unit based on the rendered diagnostic data, to transmit the user input data to the ECU, to establish a wireless communication link with the imaging device, to receive the imaging data from the imaging device, and to render the received imaging data on the display unit.

According to another exemplary embodiment of the disclosure, a method of operating a vehicle diagnostic system for a vehicle including an electronic control unit (ECU) and an associated diagnostic port includes mating a dongle of the vehicle diagnostic system with the diagnostic port to establish a wired communication link between the ECU and the dongle, establishing a wireless communication link with the ECU via the dongle using a wireless device of the vehicle diagnostic system, and receiving diagnostic data from the ECU with the wireless device. The method further includes rendering the received diagnostic data on a display unit of the wireless device, receiving user input data with an input unit of the wireless device, transmitting the user input data to the ECU, establishing a wireless communication link with an imaging device of the vehicle diagnostic system using the wireless device, generating imaging data with the imaging device, receiving the imaging data from the imaging device with the wireless device, and rendering the received imaging data on the display unit.

BRIEF DESCRIPTION OF THE DRAWINGS

The above-described features and advantages, as well as others, should become more readily apparent to those of ordinary skill in the art by reference to the following detailed description and the accompanying figures in which.

DETAILED DESCRIPTION

Figure 1:
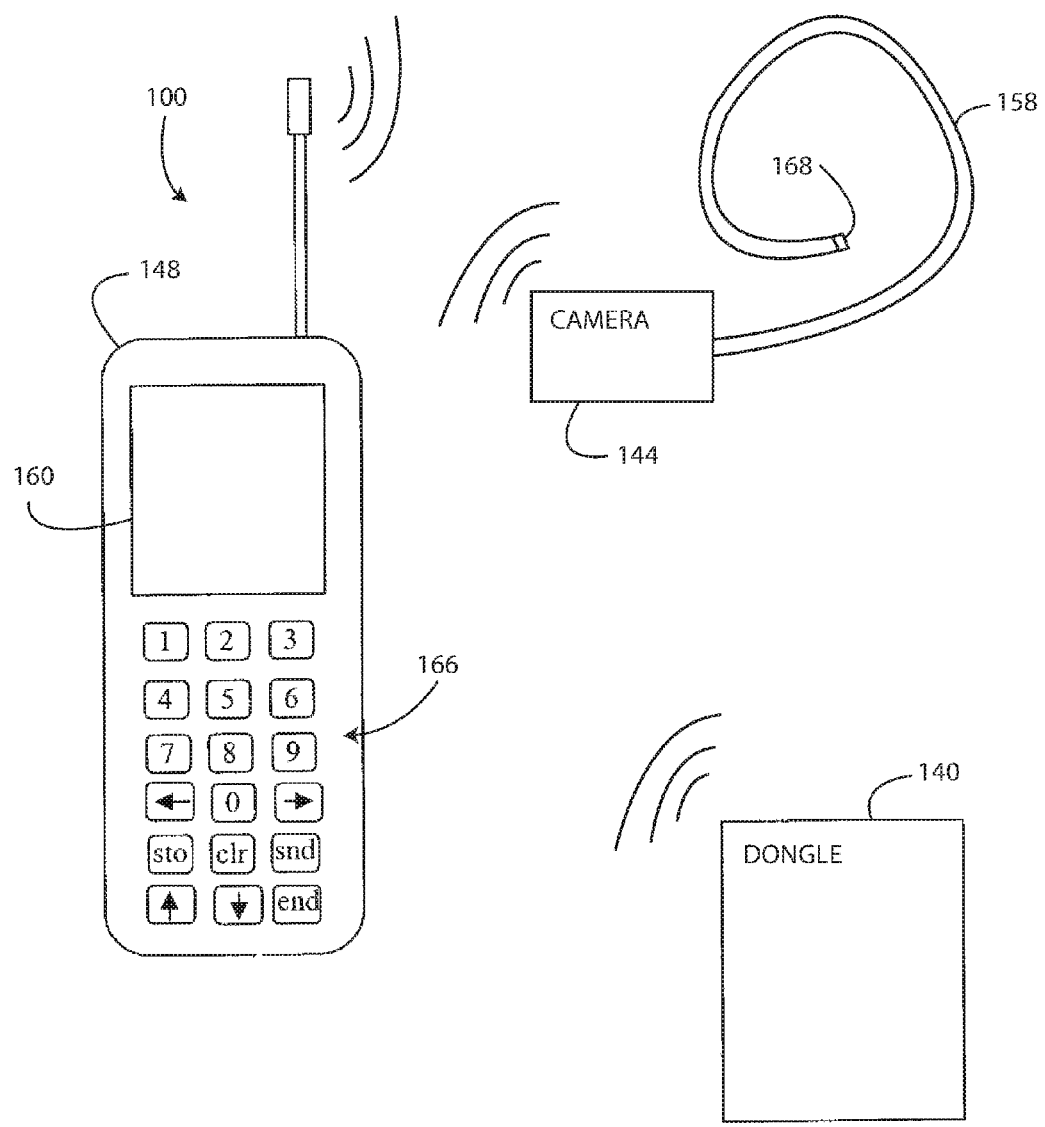
FIG. 1 is a block diagram showing a vehicle diagnostic system, as described herein, including a wireless device, a dongle, and a camera.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

Figure 2:
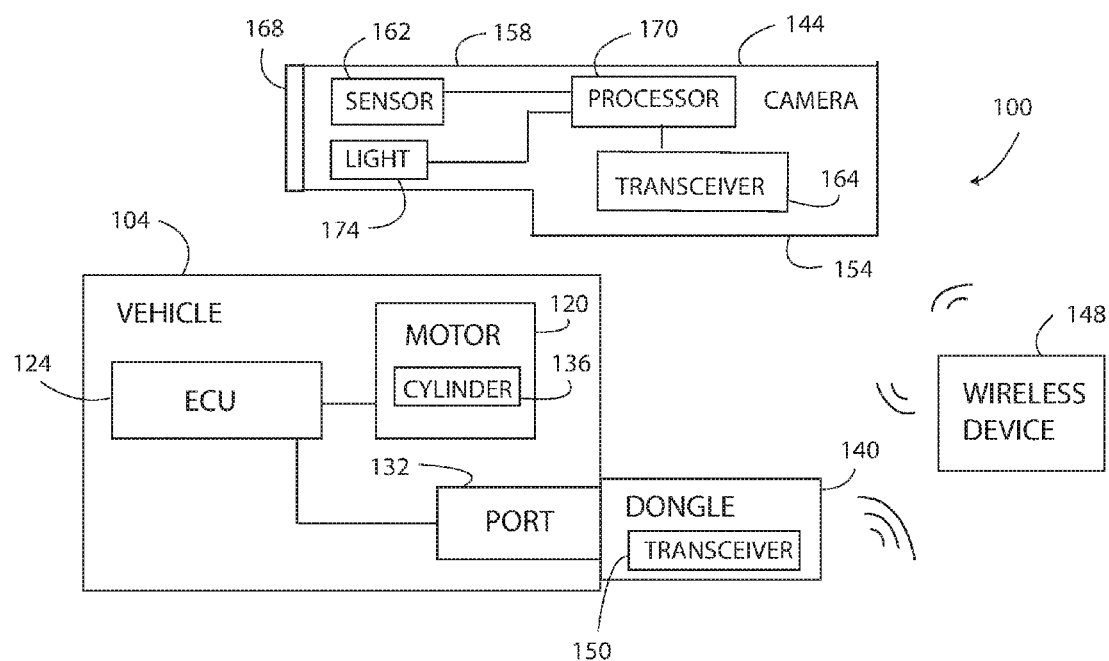
FIG. 2 is a block diagram showing the vehicle diagnostic system of FIG. 1 associated with an exemplary vehicle.

As shown in FIGS. 1 and 2, a vehicle diagnostic system 100 includes a dongle 140, a wireless inspection camera 144, and a wireless device 148. The diagnostic system 100 is associated with a vehicle 104. The vehicle 104 is representative of any type of vehicle including, but not limited to, passenger motor vehicles, commercial motor vehicles, airplanes, ships, and boats. The exemplary vehicle 104 includes a motor 120, an ECU 124, and a diagnostic port 132.

With reference to FIG. 2, the motor 120, in one embodiment, is an internal combustion engine configured to burn fuel stored in a fuel cell (not shown). The motor 120 includes at least one cylinder 136 defining a combustion chamber (not shown). In another embodiment, the motor 120 includes an electric motor configured to receive electrical energy from a chemical fuel cell (not shown). Accordingly, the vehicle 104 may be powered by an internal combustion engine only, an electric motor only, or an internal combustion engine and an electric motor (i.e. a hybrid vehicle).

The ECU 124 is a computer that is configured to monitor various sensors (not shown) that are associated with the motor 120 and other components of the vehicle 104. The ECU 124 generates and stores data related to the operation of the vehicle 104. Exemplary data generated and stored by the ECU 124 includes data indicating if the motor 120, or any of the other vehicle components monitored by the ECU, is operating outside of desired parameters.

The diagnostic port 132, which is also referred to as a connector and/or an OBD connector, is typically located within an interior of the vehicle 104 in a position that is accessible by an operator of the vehicle. The port 132 is electrically connected to the ECU 124 and is a communication interface for interfacing a device with the ECU. Accordingly, the data generated and stored by the ECU 124 are transmittable to a device that is interfaced or connected to the port 132. Additionally, data generated/received by a device interfaced or connected to the port 132 can be transmitted to the ECU 124 through the port.

As shown in FIG. 2, the dongle 140 of the diagnostic system 100 is a device that is configured to mate with the diagnostic port 132 to enable the dongle 140 to establish a wired communication link with the ECU 124. Accordingly, the dongle 140 is configured to interface with the port 132 to send data to the ECU 124 and to receive data from the ECU. Additionally, the dongle 140 is configured to send data generated by the ECU 124 to the wireless device 148. In one embodiment, the dongle 140 is a vehicle communication interface (VCI) that includes a wireless transceiver 150 configured to transmit selected data generated by the ECU 124 to another device, such as the wireless device 148, using any desired wireless communication protocol. The dongle 140 is configured to obtain data from the ECU 124 via standard vehicle protocols, such as SAE-J1850 VPW, SAE-J1850 PWM, and ISO9141, as well as enhanced data. In another embodiment of the diagnostic system 100, the dongle 140 is connected to the wireless device 148 with a hardwired connection.

With reference to FIGS. 1 and 2, the camera 144, also referred to herein as an imaging device, includes a housing 154 and a flexible optic tube 158 extending from the housing and terminated with a lens 168. As shown in FIG. 2, the camera 144 further includes an imaging sensor 162 and a light source 174 located in the flexible optic tube 158, and a transceiver 164 and a processor 170 located in the housing 154.

The optic tube 158 includes a first end connected to the housing 154 and a second opposite end spaced apart from the housing 154. Accordingly, the optic tube 158 is configured to space the lens 168 apart from the housing 154 to enable the lens to be positioned in any desired location, even extremely confined locations. The optic tube 158 has any desired length and size. In one embodiment, the optic tube 158 extends from the base portion 168 approximately two inches to twelve inches.

The sensor 162 is electrically connected to the processor 170 and is configured to generate imaging data/video data representative of an area in a field of view of the lens 168. The image data is transmitted to the processor 170. The sensor 162 is provided as any desired sensor. In another embodiment, the sensor 162 is located in the housing 154 and is configured to sense light that is received by the lens 168 and that has propagated through the optic tube 158, which may include one or more optical fibers (not shown).

The light 174 is electrically connected to the processor 170 and is configured to illuminate the area in the field of view of the lens 168. The light 174 is provided as any light source, such as a light emitting diode (LED). The flexible optic tube 158 enables the light 170 and the imaging sensor 162 to move relative to the housing 154. In another embodiment, the light 174 is located in the housing 154 and is configured transmit light through one or more optical fibers (not shown) included in the optic tube 158.

The transceiver 164 is electrically connected to the processor 170 and is configured to broadcast an image signal that includes the image data generated by the sensor 162. In one embodiment, the transceiver 164 is configured for operation according to the Bluetooth® wireless data transmission standard. In other embodiments, the transceiver 164 is any desired transceiver configured to wirelessly transmit data.

Figure 3:
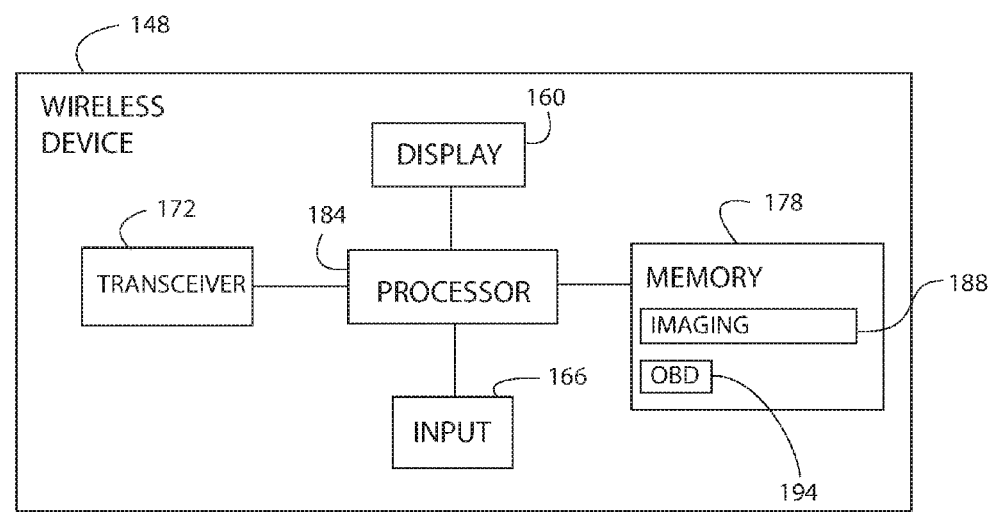
FIG. 3 is a block diagram of the wireless device of the vehicle diagnostic system of FIG. 1.

As shown in FIG. 3, the wireless device 148 includes a display 160, an input device 166, a transceiver 172, and a memory 178 each of which is connected to at least one processor 184. The wireless device 148 is typically a cellular phone/mobile phone, a smartphone, a tablet computer, or the like.

The display unit 160, which is also shown in FIG. 1, is a liquid crystal display (LCD) panel configured to display text, images, and other visually comprehensible data. The display 160, in another embodiment, is any display as desired by those of ordinary skill in the art, including, but not limited to, an active-matrix organic light-emitting diode display.

The input device 166, which is also shown in FIG. 1, includes a plurality of buttons, in one embodiment. The input device 166, also referred to herein as an input unit, is configured to enable a user to enter text data and to manipulate objects shown on the display 160. In another embodiment, the input device 166 is a touchscreen applied over the display 160 that is configured to respond to the touch of a finger or a stylus. In yet another embodiment, the input device 166 is any device configured to generate an input signal, as desired by those of ordinary skill in the art.

The transceiver 172, which is also referred to as a wireless transmitter and receiver, is operably connected to the processor 184 and is configured to wirelessly communicate with the transceiver 150 of the dongle 140 and the transceiver 164 of the camera 144 either directly or indirectly via a cellular network, a wireless local area network ("WI-FI®"), a personal area network, and/or any other wireless network. Accordingly, the transceivers 150, 164, 172 are compatible with any desired wireless communication standard or protocol including, but not limited to, Near Field Communication ("NFC"), IEEE 802.11, IEEE 802.15.1 ("Bluetooth®"), Global System for Mobiles ("GSM"), and Code Division Multiple Access ("CDMA").

The processor 184 is configured to execute program instructions (i.e. software) stored in the memory 178. The processor 184 is operably connected to the memory 178 and is configured to execute the program instructions for operating the components connected thereto, such as the display 160, the input device 166, and the transceiver 172. In one embodiment, the processor 184 executes program instructions (i.e. an application or an "app") that are downloaded from the Internet and are configured to cause the display 160 to show image data generated by the sensor 162.

The memory 178, in one embodiment, is configured to store imaging software 188 and OBD software 194. The processor 184 utilizes the imaging software 188 to convert image data generated by the sensor 162 into data that configures the display 160 for displaying images/video associated with the image data. The processor 184 utilizes the OBD software 194 for, among other things, communicating with the dongle 140 to determine the DTCs, if any, that are stored in the ECU 124. The processor 184 may configure the display 160 to display the DTCs using the OBD software 194. Additionally, the OBD software 194 includes component test data that when received by the ECU 124 causes a corresponding component of the vehicle 104 to undergo a test for proper functionality. The test data may be associated with a corresponding DTC, such that the component(s) that may have caused the ECU 124 to generate the DTC can be tested for proper functionality. The wireless device 148 is configured to send the test data to the dongle 140 to be received by the ECU 124. Thus, the diagnostic system 100 enables a test of a suspect component of the vehicle 104 to be initiated and conducted from the wireless device 148. In another embodiment, the OBD software 194 may be stored in a memory (not shown) of the dongle 140.

In operation, the vehicle diagnostic system 100 enables a technician to diagnose vehicle issues. The technician prepares the vehicle diagnostic system 100 for use with the vehicle by mating the dongle 140 with the port 132. Next, either automatically or in response to user input data received by the input 166 of the wireless device 148, the processor 184 executes the program instructions stored in the memory 178 to establish a wireless communication link between the ECU 124 and the wireless device 148 via the dongle 140.

With the communication link established between the wireless device 148 and the ECU 124, the technician can use the wireless device 148 to diagnose vehicle issues. To begin, either automatically or in response to user input data received by the input 166 and send to the ECU 124, the dongle 140 wirelessly sends diagnostic data generated by the ECU 124 to the wireless device 148. The wireless device 148 receives and processes the diagnostic data, and typically renders at least some of the diagnostic data on the display 160. The technician reviews the rendered diagnostic data and then, if appropriate, takes steps to resolve any vehicle issues.

For example, in one embodiment, the technician uses the wireless device 148 to send command data, based on a user command received by the input 166, to the dongle 140. When the dongle 140 receives the command data, the dongle queries the ECU 124 for diagnostic data related to the command data and then sends the diagnostic data to the wireless device 148. The processor 184 of the wireless device 148 processes the data with the OBD software 194, for example, and renders the received diagnostic data on the display 160.

In some instances, the rendered diagnostic data includes an option for the technician to cause the ECU 124 to initiate a test of a vehicle component, such as the motor 120. If the test is initiated by the technician, the wireless device 148 sends instruction data to the ECU 124 via the dongle 140 that causes the ECU 124 to conduct the test of a vehicle component. During and/or after the test, the ECU 124 collects test result data from at least one sensor associated with the vehicle component, and then sends the test result data to the wireless device 148. Upon receiving test result data, the wireless device 148 renders the test result data on the display 160 for analysis and review by the technician.

According to another example, the ECU 124 may generate diagnostic data based on stored DTCs (i.e. DTC data). If any DTCs are stored in the ECU 124, the ECU sends the diagnostic data (including the DTC data) to the dongle 140, and the dongle 140 sends the diagnostic data to the wireless device 148 via the transceiver 150. In response to receiving DTC data, the processor 184 executes the program instructions and the OBD software 194, if necessary, in order to render the DTCs on the display 160.

Responsive to at least one DTC being shown on the display 160, the technician may conduct a test on a component of the vehicle 104 that is likely to have caused the ECU 124 to generate the DTC, or a component of the vehicle 104 that is related to the generation of the DTC. To begin, the technician uses the input 166 of the wireless device 148 to select the DTC to be investigated. In response to the selection, the input 166 generates user input data based on the rendered diagnostic data and the processor 184 executes the program instructions to cause the display 160 to show suggested component tests and troubleshooting data that may be useful in resolving the vehicle issue(s) that has/have caused the DTC. Typically, the troubleshooting data includes at least troubleshooting instructions to be performed on the vehicle based on the selected DTC, for example.

Next, the technician selects at least one of the component tests and the display 160 renders data that instructs the technician how to prepare the vehicle 104 for the component test, the location of the component(s) to be tested, and any additional tools that may be required to complete the component test. For example, the inspection camera 144 may be required to determine if the component(s) to be tested is properly functioning, especially when the component(s) is located in an extremely confined area of the vehicle 104 that is too confined to be viewed with the naked eye.

To prepare the inspection camera 144 for monitoring a vehicle component, the camera is paired with the wireless device 148 so that the image data generated by the sensor 162 is shown on the display 160 of the wireless device 148. That is, a wireless communication link is established between the camera 144 and the wireless device 148, such that the wireless device is able to receive imaging data from the camera 144 and the imaging data is rendered on the display 160. Second, the camera 144 is positioned so that a desired portion of the vehicle 104, such as the component to be tested, is in a field of view of the lens 168. When lens 168 is positioned in the desired location, image data of the desired location is transmitted by the transceiver 164 to the transceiver 172 of the wireless device 148 and is shown on the display 160, thereby enabling the technician to "view" the component(s) located in the extremely confined area.

Next, after placing the inspection camera 144 in the desired location, the technician initiates the component test using the input 166 of the wireless device 148, which causes the transceiver 172 to send test data of the OBD software 194 to the transceiver 150 of the dongle 140. The dongle 140 then sends the test data to the ECU 124, and the ECU processes the test data, which causes the component(s) to be tested to undergo a test sequence. Since, in this example, the technician has positioned the inspection camera 144 in a location suitable for monitoring the component under test, the camera generates imaging data based on the tested component, and the technician is able to monitor the component during the test sequence and visually determine if the component is properly functioning. That is, the processor 184 is configured to render the imaging data of the tested component on the display 160. The wireless device 148 may record image data of the component under test to enable the technician to show a video recording of the test sequence to an expert and/or to a customer.

As an example of the above procedure, consider that the wireless device 148 receives a DTC from the dongle 140 indicating that a cylinder mis-fire code has been generated by the ECU 124. The technician selects the DTC using the wireless device 148, which causes the wireless device to display diagnostic information that may assist the technician in resolving the issue on the display 160. For example, the diagnostic information may instruct the technician to use the inspection camera 144 to view a certain fuel injector (not shown) of the motor 120. The technician follows the instructions displayed by the wireless device 148 and proceeds to remove a spark plug (not shown) from the cylinder 136. Next, the technician inserts the lens 168 of the inspection camera 144 into the cylinder 136 in a location that is suitable for monitoring the fuel injector. After properly configuring the inspection camera 144, the technician uses the input 166 of the wireless device 148 to activate a component test to be conducted by the ECU 124. The component test activates the suspect fuel injector. During the component test, the technician monitors the suspect fuel injector on the display 160 to quickly determine if fuel injector is properly spraying fuel.

The diagnostic system 100 is well suited for the modern trend of technicians using a personally owned wireless device 148, such as a cell phone, in the work environment as a front end for peripheral diagnostic tools, such as the camera 144. The diagnostic system 100 prevents the technician from having to purchase a standalone inspection camera system.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A vehicle diagnostic system for a vehicle including an electronic control unit (ECU) and an associated diagnostic port, the vehicle diagnostic system comprising:
   a dongle configured to mate with the diagnostic port to enable the dongle to establish a wired communication link with the ECU;
   an imaging device configured to generate imaging data; and
   a single wireless device including a display unit, an input unit, a memory storing program instructions, and a processor configured to execute the program instructions
      to establish a first wireless communication link with the ECU via the dongle,
      to receive diagnostic data from the ECU,
      to render the received diagnostic data on the display unit,
      to receive user input data from the input unit based on the rendered diagnostic data,
      to transmit the user input data to the ECU,
      to send component test data to the ECU based on the user input data, the component test data configured to cause the ECU to conduct a test of at least one vehicle component associated with the rendered diagnostic data, such that the at least one vehicle component undergoes a test sequence,
      to establish a second wireless communication link with the imaging device,
      to receive the imaging data from the imaging device of the at least one vehicle component undergoing the test sequence, and
      to render the received imaging data on the display unit.

2. The vehicle diagnostic system of claim 1, wherein:
   the memory stores on-board diagnostic (OBD) software, and
   the processor is configured to execute the OBD software
      to determine if the received diagnostic data includes diagnostic trouble code data, and
      to render the diagnostic trouble code data on the display unit as at least one diagnostic trouble code.

3. The vehicle diagnostic system of claim 2, wherein:
   the processor is configured to execute the program instructions and the OBD software
      to receive user selection data from the input unit identifying a selected rendered diagnostic trouble code, and
      to render troubleshooting data associated with the selected rendered diagnostic trouble code on the display unit,
   the troubleshooting data includes at least troubleshooting instructions to be performed on the vehicle based on the selected rendered diagnostic trouble code.

4. The vehicle diagnostic system of claim 3, wherein:
   the processor is configured to execute the program instructions and the OBD software to send the component test data to the ECU.

5. The vehicle diagnostic system of claim 1, wherein:
   the processor is configured to execute the program instructions
      to receive test result data associated with the at least one vehicle component undergoing the test sequence from the ECU, and
      to render the received test result data on the display unit.

6. The vehicle diagnostic system of claim 1, wherein the wireless device is configured as a cellular phone.

7. The vehicle diagnostic system of claim 1, wherein:
   the processor establishes the first wireless communication link with the ECU by establishing a further wireless communication link with a transceiver of the dongle.

8. The vehicle diagnostic system of claim 1, wherein:
   the processor establishes the second wireless communication link with the imaging device by establishing a further wireless communication link with a transceiver of the imaging device.

9. The vehicle diagnostic system of claim 1, wherein the imaging device includes:
   a housing;
   a processor located within the housing;
   a flexible optic tube having a first end connected to the housing and a second opposite end spaced apart from the housing;
   an imaging sensor located at the second opposite end of the flexible optic tube and electrically connected to the processor, the imaging sensor configured to generate the imaging data; and a light source located at the second opposite end of the flexible optic tube and electrically connected to the processor, wherein the imaging sensor and the light source are movable relative to the housing.

10. The vehicle diagnostic system of claim 9, wherein:

the imaging device further includes a transceiver, and the processor establishes the second wireless communication link with the imaging device by establishing a further wireless communication link with the transceiver of the imaging device.

11. A method of operating a vehicle diagnostic system for a vehicle including an electronic control unit (ECU) and an associated diagnostic port, the method comprising:

mating a dongle of the vehicle diagnostic system with the diagnostic port to establish a wired communication link between the ECU and the dongle;

establishing a first wireless communication link with the ECU via the dongle using a wireless device of the vehicle diagnostic system;

receiving diagnostic data from the ECU with the wireless device;

rendering the received diagnostic data on a display unit of the wireless device;

receiving user input data with an input unit of the wireless device, the user input data based on the rendered diagnostic data;

transmitting the user input data to the ECU;

initiating a test of at least one vehicle component from the wireless device by transmitting component test data to the ECU from the wireless device, the at least one vehicle component associated with the rendered diagnostic data;

conducting a test sequence of at least one vehicle component based on the sent component test data using the ECU;

establishing a second wireless communication link with an imaging device of the vehicle diagnostic system using the wireless device;

generating imaging data with the imaging device of the at least one vehicle component associated with the rendered diagnostic data during the conducted test sequence;

receiving the imaging data from the imaging device with the wireless device; and rendering the received imaging data on the display unit.

12. The method of claim 11, further comprising:

executing on-board diagnostic (OBD) software stored in a memory of the wireless device to determine if the received diagnostic data includes diagnostic trouble code data; and rendering the diagnostic trouble code data on the display unit as at least one diagnostic trouble code.

13. The method of claim 12, further comprising:

receiving user selection data identifying a selected rendered diagnostic trouble code with the input unit; and rendering troubleshooting data associated with the selected rendered diagnostic trouble code on the display, the troubleshooting data including at least troubleshooting instructions to be performed on the vehicle based on the selected rendered diagnostic trouble code.

14. The method of claim 11, further comprising:

using the wireless device as a cellular phone.

* * * * *